(12) United States Patent
Cho et al.

(10) Patent No.: US 10,347,904 B2
(45) Date of Patent: Jul. 9, 2019

(54) MULTI-LAYER POLYMER COATED LI ANODE FOR HIGH DENSITY LI METAL BATTERY

(71) Applicant: SolidEnergy Systems, LLC, Woburn, MA (US)

(72) Inventors: Myung Cho, Roslyn Heights, NY (US); Qichao Hu, Somerville, MA (US)

(73) Assignee: SolidEnergy Systems, LLC, Woburn, MA (US)

( * ) Notice: Subject to any disclaimer, the term of this patent is extended or adjusted under 35 U.S.C. 154(b) by 45 days.

(21) Appl. No.: 15/185,772

(22) Filed: Jun. 17, 2016

(65) Prior Publication Data

US 2016/0372743 A1 Dec. 22, 2016

Related U.S. Application Data

(60) Provisional application No. 62/182,157, filed on Jun. 19, 2015.

(51) Int. Cl.
*H01M 4/02* (2006.01)
*H01M 4/38* (2006.01)
(Continued)

(52) U.S. Cl.
CPC ........... *H01M 4/134* (2013.01); *H01M 4/382* (2013.01); *H01M 4/62* (2013.01); *H01M 4/622* (2013.01);
(Continued)

(58) Field of Classification Search
CPC ........ H01M 4/36; H01M 4/366; H01M 4/134; H01M 4/38; H01M 4/382; H01M 10/0525; H01M 10/0565
See application file for complete search history.

(56) References Cited

U.S. PATENT DOCUMENTS 2,688,006 A 8/1954 Steinman
3,640,829 A 2/1972 Elton
(Continued)

FOREIGN PATENT DOCUMENTS

CN 103794755 A 5/2014

OTHER PUBLICATIONS

International Search Report and Written Opinion issued by the U.S. Patent and Trademark Office as International Searching Authority for International Application No. PCT/US2016/038082 dated Sep. 7, 2016 (14 pgs.).

(Continued)

*Primary Examiner* — Karie O'Neill Apicella
(74) *Attorney, Agent, or Firm* — Wilmer Cutler Pickering Hale and Dorr LLP (57) ABSTRACT

A lithium metal anode includes a lithium metal layer and a multi-layer polymer coating disposed over the lithium metal layer. The multi-layer polymer coating includes a first outer polymeric crosslinked gel layer positioned for contact with a battery electrolyte and a second inner polymer layer disposed between the lithium metal layer and the first outer polymeric crosslinked gel layer. The first outer polymeric crosslinked gel layer includes a first polymer, a soft segment polymer, and an electrolyte. The second inner polymer layer includes a second polymer. The second inner polymer layer provides mechanical strength and serves as a physical barrier to the lithium metal layer.

20 Claims, 7 Drawing Sheets (51) Int. Cl.
  *H01M 4/62*   (2006.01)
  *H01M 4/134*  (2010.01)
  *H01M 10/052* (2010.01)

(52) U.S. Cl.
  CPC .......... *H01M 4/623* (2013.01); *H01M 10/052* (2013.01); *H01M 2004/027* (2013.01); *H01M 2300/0082* (2013.01)

(56) References Cited

U.S. PATENT DOCUMENTS

| | | | |
|---|---|---|---|
| 5,427,872 | A | 6/1995 | Shen |
| 5,648,187 | A | 7/1997 | Skotheim |
| 5,824,434 | A | 10/1998 | Kawakami et al. |
| 6,025,094 | A | 2/2000 | Visco et al. |
| 6,723,140 | B2 | 4/2004 | Chu et al. |
| 6,733,924 | B1 | 5/2004 | Skotheim et al. |
| 6,737,197 | B2 | 5/2004 | Chu et al. |
| 6,797,428 | B1 | 9/2004 | Skotheim et al. |
| 6,911,280 | B1 | 6/2005 | De Jonghe et al. |
| 7,081,142 | B1 | 7/2006 | Carlson |
| 7,112,389 | B1 | 9/2006 | Arora |
| 7,247,408 | B2 | 7/2007 | Skotheim et al. |
| 7,282,295 | B2 | 10/2007 | Visco et al. |
| 8,105,717 | B2 | 1/2012 | Skotheim et al. |
| 8,114,171 | B2 | 2/2012 | Visco et al. |
| 8,197,971 | B2 | 6/2012 | Skotheim et al. |
| 8,501,339 | B2 | 8/2013 | Visco et al. |
| 8,603,682 | B2 | 12/2013 | Yu et al. |
| 8,617,748 | B2 | 12/2013 | Mikhaylik et al. |
| 8,623,557 | B2 | 1/2014 | Skotheim et al. |
| 8,728,661 | B2 | 5/2014 | Skotheim et al. |
| 8,753,771 | B2 | 6/2014 | Skotheim et al. |
| 8,778,522 | B2 | 7/2014 | Visco et al. |
| 8,828,580 | B2 | 9/2014 | Visco et al. |
| 9,065,149 | B2 | 6/2015 | Skotheim et al. |
| 9,368,775 | B2 | 6/2016 | Visco et al. |
| 9,397,342 | B2 | 7/2016 | Skotheim et al. |
| 9,653,735 | B2 | 5/2017 | Skotheim et al. |
| 2002/0012846 | A1 | 1/2002 | Skotheim et al. |
| 2005/0042515 | A1 | 2/2005 | Hwang et al. |
| 2006/0191794 | A1 | 8/2006 | Jarvis |
| 2008/0057386 | A1 | 3/2008 | Visco et al. |
| 2009/0155676 | A1 | 6/2009 | Zhamu et al. |
| 2011/0104571 | A1 | 5/2011 | Zhamu |
| 2011/0165462 | A1 | 7/2011 | Zhamu |
| 2011/0165482 | A1 | 7/2011 | Chartier et al. |
| 2011/0177398 | A1* | 7/2011 | Affinito ................ H01M 4/134 429/325 |
| 2012/0003532 | A1 | 1/2012 | Badding et al. |
| 2013/0017441 | A1 | 1/2013 | Affinito et al. |
| 2013/0059202 | A1 | 3/2013 | Nishimura |
| 2013/0236764 | A1 | 9/2013 | Hu et al. |
| 2014/0220439 | A1 | 8/2014 | Badding et al. |
| 2015/0037651 | A1 | 2/2015 | Huang |
| 2015/0064602 | A1 | 3/2015 | Lee |
| 2015/0318552 | A1 | 11/2015 | Skotheim et al. |

OTHER PUBLICATIONS

International Search Report and Written Opinion issued by the U.S. Patent and Trademark Office as International Searching Authority for International Application No. PCT/US2016/24968 dated Jul. 1, 2016 (12 pgs.).

Lee, et al., "A Simple Composite Protective Layer Coating that Enhances the Cycling Stability of Lithium Metal Batteries," J. Power Sources, vol. 284, pp. 103-108 (2015).

Tung, et al., "A Dendrite-Suppressing Composite Ion Conductor from Aramid Nanofibers," Nature Communications, vol. 6, pp. 1-7 (2015).

Villaluenga, et al., "Cation Only Conduction in New Polymer-$SiO_2$ Nanohybrids: $Na^+$Electrolytes," J. Mater. Chem. A., vol. 1, pp. 8348-8352 (2013).

Yang, et al. "Dispersions of Aramid Nanofibers: A New Nanoscale Building Block," ACS Nano, vol. 5, No. 9, pp. 6945-6954 (2011).

Zheng, et al., "Interconnected Hollow Carbon Nanospheres for Stable Lithium Metal Anodes," Nature Nanotechnology, Advanced Online Publication, vol. 9, No. 8, 6 pgs. (2014).

Song, et al., "Ionomer-Liquid Electrolyte Hybrid Ionic Conductor for High Cycling Stability of Lithium Metal Electrodes," Scientific Reports, vol. 5, 9 pgs. (2015).

Villaluenga et al., "Cation only conduction in new polymer-$SiO_2$ nanohybrids: $Na^+$electrolytes," Journal of Materials Chemistry A, vol. 1, No. 29, pp. 8348-8352 (2013).

* cited by examiner

MULTI-LAYER POLYMER COATED LI ANODE FOR HIGH DENSITY LI METAL BATTERY

INCORPORATION BY REFERENCE

This application claims benefit under 35 U.S.C. 119(e) to U.S. Provisional Patent Application No. 62/182,157, filed on Jun. 19, 2015, the entirety of which is explicitly incorporated by reference herein.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described herein.

TECHNICAL FIELD

The present invention relates generally to the field of lithium ion batteries. In particular, the invention relates to metal anodes for use in electrochemical cells. The invention also relates to methods of making lithium anodes, electrochemical cells incorporating the lithium anodes and methods of their use.

BACKGROUND

Li metal anodes have attracted attention due to the possibility of developing high energy density batteries. Unfortunately, rechargeable lithium batteries employing lithium metal anodes have not been commercialized, mainly due to issues of safety and cycle life properties. These difficulties are due mainly to the Li metal anode. In particular, the Li metal is highly reactive with most organic compounds, which limits the selection of an electrolyte. Also, during charging and discharging, lithium dendrites gradually grow out from the lithium anode surface and into the electrolyte. Left unperturbed, the dendrites can eventually contact the cathode and short the cell. Various approaches have been suggested to address the reactivity of the Li metal anode in liquid electrolytes, but without success.

It has been proposed to provide a protective layer on the electrolyte-facing side of the lithium metal layer. Such protective layers should conduct lithium ions, while simultaneously preventing electrolyte from contacting the anode metal; such approaches are discussed, for example, in U.S. Patent Application Publication No. 2008/0057386.

One previously-suggested approach to reducing dendrite growth and increasing cycle life has been to use a single ion conductor coating such as glassy or amorphous single metal oxides. In other approaches, an alloy of a metal with lithium has been used. Other inorganic additives have been deposited using vacuum deposition. In other approaches, combinations of inorganic, e.g., single ion conductor, and organic polymer layers have been used as protective coatings. More recently, compositions employing organic polymer have been employed. However, the polymer coating layers have not demonstrated sufficient mechanical strength and are easily shattered or damaged by swelling due to solvation with the electrolyte.

An effective and efficient way to increase the cycle life and increase the safety of Li metal high density batteries is still needed.

SUMMARY

In one or more embodiments, a multi-layered coating is described that prevents or delays direct contact with Li metal anode and also prevents internal shorting by Li dendrites. In one or more embodiments, the multi-layered coating extends the useful life of the battery and improves the battery safety. In one or more embodiments, the multi-layered coating includes at least two polymeric layers. In one or more embodiments, one of the polymeric layers is a polymer gel layer. In one or more embodiments, the polymer gel layer is a crosslinked polymer gel layer or a swollen polymer gel layer. In one or more embodiments, one of the polymeric layers is a single ion conductor (or polyelectrolyte) layer.

In one or more embodiments, a lithium metal anode includes a lithium metal layer; and a multi-layer polymer coating over the lithium metal layer. In one or more embodiments, the polymer coating includes a first outer layer positioned for contact with an electrolyte. In one or more embodiments, the polymer coating also includes a second inner layer disposed between the lithium metal layer and the first outer layer, e.g., the second inner layer may be disposed on the lithium metal layer. In one or more embodiments, the second inner layer includes a second polymer providing mechanical strength and a physical barrier to the lithium metal layer.

In one or more embodiments, one of the layers of the multi-layer polymer coating is a polymeric crosslinked gel layer. In one or more embodiments, the first outer layer of the multi-layer polymer coating is the polymeric crosslinked gel layer. In one or more embodiments, the polymeric crosslinked gel layer is formed and then coated (e.g., laminated) on top of the second inner layer. In one or more embodiments, the polymeric crosslinked gel layer is formed by mixing a polymer (e.g., soft segment polymer, e.g., PVDF) with a crosslinking monomer or macro-monomer (e.g., elastomeric polymer monomer, e.g., polyurethane monomer), an electrolyte, and a salt, and curing the mixture (e.g., by UV or heat). In one or more embodiments, the crosslinking monomer is di-functional, tri-functional, or has any multi-functional groups with double bonds for radical polymerization.

In one or more embodiments, the first outer layer includes a first polymer and a liquid phase that swells the first polymer to form a swollen (or solvated) polymer gel. The first polymer may be chosen such that it is not dissolved by the electrolyte. In one or more embodiments, the swollen polymer gel forms in situ. In one or more embodiments, the swollen polymer gel forms (e.g., becomes swollen) once the liquid electrolyte is added to the battery, e.g., right before the battery or pouch is closed. In one or more embodiments, the first polymer of the first outer polymer layer includes a liquid phase. In one or more embodiments, the first polymer layer is coated onto the second inner polymer layer.

In one or more embodiments, the second inner layer includes at least one polymer that is the same as the polymer in the first outer layer. In one or more embodiments, the second inner layer includes a polymer that is different than the polymer in the first outer layer. In one or more embodiments, the second inner polymer layer is thicker than the first outer polymer layer. In one or more embodiments, the second inner polymer layer is thinner than the first outer polymer layer. In one or more embodiments, the second inner polymer layer has the same thickness as the first outer polymer layer.

In one or more embodiments, the liquid phase is or includes a material that is identical to at least one (or all) materials in the electrolyte. In one or more embodiments, the liquid phase is or includes a material that is different than at least one (or all) materials in the electrolyte.

In one or more embodiments, the first outer layer includes a first elastomeric gel polymer and a liquid phase that swells the elastomeric polymer to form an elastomeric gel polymer. In one or more embodiments, the elastomeric gel polymer effectively prevents dendrite growth and extends the cycle life of cells. In one or more embodiments, the elastomeric gel polymer has physical strength between about 1 to about 10 mega pascals.

In one or more embodiments, the elastomeric polymer has high physical resistance against dendrite growth and also suppresses the volume expansion of cells during cycling. In one or more embodiments, employing an elastomeric gel in a Lithium metal anode provides another advantage of reducing the reactivity between the Lithium metal surface and the electrolyte. In one or more embodiments, the elastomeric gel has a crosslinked polymer back bone. In one or more embodiments, the liquid electrolyte impregnates or becomes trapped in the gel matrix layer with a crosslinked polymer back bone. Thus, in one or more embodiments, the elastomeric gel polymer prohibits the liquid electrolyte from directly contacting the lithium metal. Accordingly, in one or more embodiments, the elastomeric gel polymer layer stabilizes the reactivity of Lithium and leads to uniform SEI formation on Lithium metal surface.

In one or more embodiments, the second inner layer includes a single ion conductor or polyelectrolyte (e.g., a polymer with a sulfonate or any other strong acid group attached to the polymer matrix in lithium salt form). In one or more embodiments, the second inner layer includes a single ion conductor or polyelectrolyte, and the first outer layer is a swelled polymer gel layer or a polymeric crosslinked gel layer.

In one or more embodiments, the polymer (e.g., of any layers of the multilayer coating) is selected from the group consisting of fluoropolymers, polyacrylonitriles, polyether ketone, poly(ether ether sulfones), polystyrenes, and any combination thereof. In one or more embodiments, other suitable polymers are contemplated and may be used.

In one or more embodiments, the polymer (e.g., of any layers of the multilayer coating) is or includes one or more fluoropolymers selected from the group consisting of homo polymers and copolymers of polyvinylidene difluoride (PVDF), polyvinyl fluoride (PVF), poly(tetrafluoroethylene) (PTFE), polychlorotrifluoroethylene (PCTFE), perfluoroalkoxy polymers, fluorinated ethylene-propylene (FEP), polyethylenechloridetetrafluoroethylene (PECTFE), and any combination thereof.

In one or more embodiments, the polymer (e.g., of any layers of the multilayer coating) is an elastomeric polymer. In one or more embodiments, the elastomeric polymer is or includes one or more polymers selected from the group consisting of polyurethane (PU), styrene-butadiene rubber (SBR), polyethylene glycol dimethacrylate (PEGDMA), silicone based polymers such as, for example, poly(diphenyl-co-dimethylsiloxane) (DPh-DM), and any combination thereof. In one or more embodiments, other elastomeric polymers are contemplated and may be used.

In one or more embodiments, the liquid phase is or includes one or more liquids selected from the group consisting of ionic liquid(s), organic plasticizer(s), and any combination thereof. In one or more embodiments, the liquid phase could include any conventional electrolyte or mixture of electrolytes.

In one or more embodiments, the battery includes a polymeric crosslinked gel layer between the battery electrolyte and the lithium metal anode. In one or more embodiments, the polymeric crosslinked gel layer is provided as the only coating on the lithium metal layer (e.g., as a single-layer and not as a multi-layer coating).

In one or more embodiments, including any of the embodiments discussed above, the second inner layer includes one or more of an ionic liquid, a plasticizer, and an oligomer.

In one or more embodiments, including any of the embodiments discussed above, the second inner polymer layer has a toughness selected to reduce dendrite formation.

In one or more embodiments, including any of the embodiments discussed above, the thickness of the second inner layer is in the range of about 0.2 to about 2 µm, e.g., about 0.2-0.3, 0.25-0.35, 0.3-0.4, 0.35-0.5, 0.45-0.6, 0.5-0.75, 0.2-1, 0.8-1, 0.9-1.1, 1-1.25, 1.1-1.35, 1.25-1.5, 1-1.5, 1.4-1.65, 1.6-1.75, 1.7-1.9, 1.8-1.95, 1-2, 1.9-2 µm.

In one or more embodiments, including any of the embodiments discussed above, the thickness of the first outer layer is in the range of about 1 to about 2 µm, e.g., about 1-1.1, 1-1.25, 1.1-1.35, 1.25-1.5, 1-1.5, 1.4-1.65, 1.6-1.75, 1.7-1.9, 1.8-1.95, 1.5-2, 1.9-2 µm.

In one or more embodiments, including any of the embodiments discussed above, the anode further includes a current collector in electrical contact with the lithium metal layer.

In one or more embodiments, a lithium ion battery includes a positive electrode; a negative electrode as described herein, a separator disposed between the positive and negative electrodes; and an electrolyte.

One aspect discussed herein relates to a lithium metal anode including a lithium metal layer; and a multi-layer polymer coating disposed over the lithium metal layer. The multi-layer polymer coating includes a first outer polymeric crosslinked gel layer positioned for contact with a battery electrolyte. The first outer polymeric crosslinked gel layer includes a first polymer, a soft segment polymer, and an electrolyte within a crosslinked matrix. The multi-layer polymer coating includes a second inner layer disposed between the lithium metal layer and the first outer polymeric crosslinked gel layer. The second inner layer includes a second polymer providing mechanical strength and a physical barrier to the lithium metal layer.

In one or more embodiments, the soft segment polymer and the second polymer, or the soft segment polymer and the second polymer is one or more polymers selected from the group consisting of fluoropolymers, polyacrylonitriles, polyether ketone, poly(ether ether sulfones) and polystryrenes, and any combination thereof. In one or more embodiments, other suitable polymers are contemplated and may be used. In one or more embodiments, the soft segment polymer, the second polymer, or the soft segment polymer and the second polymer includes one or more fluoropolymers selected from the group consisting of homo polymers and copolymers of polyvinylidene difluoride (PVDF), polyvinyl fluoride (PVF), poly(tetrfluoroethylene) (PTFE), polychlorotrifluoroethylene (PCTFE), perfluoroalkoxy polymers, fluorinated ethylene-propylene (FEP), and polyethylenechloridetetrafluoroethylene (ECTFE). In one or more embodiments, other suitable fluoropolymers are contemplated and may be used.

In one or more embodiments, the first polymer, the second polymer, or the first polymer and the second polymer is or includes an elastomeric polymer. In one or more embodiments, the elastomeric polymer is selected from the group consisting of polyurethane functional elastomers, styrene-butadiene block copolymers, fluorinated copolymers, silicone based polymers such as poly(diphenyl-co-dimethylsiloxane) (DPh-DM), and any combination thereof. In one or more embodiments, other elastomeric polymers are contemplated and may be used.

In one or more embodiments, the second polymer is or includes a single ion conductor (also referred to as a polyelectrolyte). In one or more embodiments, the second polymer is or includes a functional group selected from the group consisting of a sulfonic acid group, a carboxylic acid group, and a phosphonic acid group. In one or more embodiments, the second polymer includes an anionic functional group.

In one or more embodiments, the first outer polymeric crosslinked gel layer is formed by mixing the soft segment polymer, a first polymer monomer, an electrolyte, and a salt, and curing the mixture (e.g., by UV light or heat). In one or more embodiments, the salt includes an ionic liquid including salts of lithium. In one or more embodiments, the ionic liquid is selected from N-butyl-N-methyl pyrrolidinium ($Pyr1^{4+}$) and N-methyl-N-propyl pyrrolidinium cations ($Pyr1^{3+}$) and bis(trifluoromethanesulfonyl)imide ($TFSI^-$) and bis(fluorosulfonyl)imide ($FSI^-$) salts. In one or more embodiments, the electrolyte includes an electrolyte solvent and a lithium salt. In one or more embodiments, the electrolyte solvent is selected from the group consisting of ethylene carbonate, diethyl carbonate, dimethyl carbonate, propylene carbonate, dimethoxyethane, and any combination thereof.

In one or more embodiments, the second inner layer includes one or more of an ionic liquid, a plasticizer and an oligomer.

In one or more embodiments, the second inner layer has a toughness selected to reduce dendrite formation.

In one or more embodiments, the thickness of the second inner layer is in the range of 0.2-2 μm. In one or more embodiments, the thickness of the first outer layer is in the range of 1-2 μm.

In one or more embodiments, the lithium anode also includes a current collector in electrical contact with the lithium metal layer.

Another aspect discussed herein relates to a lithium ion battery including a positive electrode, a negative electrode according to any of the embodiments or aspects discussed herein, a separator disposed between the positive and the negative electrode, and a battery electrolyte.

Another aspect discussed herein relates to a lithium ion battery including a cathode, a lithium metal anode according to any of the embodiments or aspects discussed herein, and the battery electrolyte.

Yet another aspect discussed herein relates to a method of preparing a lithium anode battery, the method including coating a lithium metal anode with a second inner polymer layer; mixing a first polymer monomer with the soft segment polymer, a salt, and an electrolyte to form a mixture; curing the mixture to form a first outer polymeric crosslinked gel layer; coating the second inner polymer layer with the first outer polymeric crosslinked gel layer; and adding a cathode and a battery electrolyte and sealing the lithium anode battery.

In one or more embodiments, the second polymer is a single ion conductor.

Another aspect discussed herein relates to a lithium metal anode including a lithium metal layer and a multi-layer polymer coating disposed over the lithium metal layer. The multi-layer polymer coating includes a first outer layer positioned for contact with a battery electrolyte. The first outer layer includes a liquid phase and a first polymer that is swelled by the liquid phase to form a polymer gel. The multi-layer coating also includes a second inner layer disposed between the lithium metal layer and the first outer layer, the second layer including a second polymer providing mechanical strength and a physical barrier to the lithium metal layer.

In one or more embodiments, the first polymer, the second polymer, or the first polymer and the second polymer is one or more polymers selected from the group consisting of fluoropolymers, polyacrylonitriles, polyether ketone, poly (ether ether sulfones) and polystryrenes, and any combination thereof. In one or more embodiments, the first polymer, the second polymer, or the first polymer and the second polymer is or includes one or more fluoropolymers selected from the group consisting of homo polymers and copolymers of polyvinylidene difluoride (PVDF), polyvinyl fluoride (PVF), poly(tetrfluoroethylene) (PTFE), polychlorotrifluoroethylene (PCTFE), perfluoroalkoxy polymers, fluorinated ethylene-propylene (FEP), and polyethylenechloridetetrafluoroethylene (ECTFE).

In one or more embodiments, the first polymer, the second polymer, or the first polymer and the second polymer is elastomeric. In one or more embodiments, the elastomeric polymer is selected from the group consisting of polyurethane functional elastomers, styrene-butadiene block copolymers, fluorinated copolymers, silicone based polymers such as poly(diphenyl-co-dimethylsiloxane) (DPh-DM) and any combination thereof. In one or more embodiments, other elastomeric polymers are contemplated and may be used.

In one or more embodiments, the second polymer is a single ion conductor. In one or more embodiments, the second polymer comprises a functional group selected from the group consisting of a Li salt form of sulfonic acid group, a carboxylic acid group, nitric acid, and a phosphonic acid group (for example, $-SO_3-Li$ sulfonic acid Li salt, $-COO-Li$, $-NO3-Li$, and $-PO3-Li$).

In one or more embodiments, the liquid phase is one or more liquids selected from the group consisting of ionic liquids, plasticizers, oligomers, and any combination thereof.

In one or more embodiments, the oligomers include oligomer salts of lithium.

In one or more embodiments, the liquid phase includes an ionic liquid comprising salts of lithium.

In one or more embodiments, the ionic liquid is selected from N-butyl-N-methyl pyrrolidinium ($Pyr1^{4+}$) and N-methyl-N-propyl pyrrolidinium cations ($Pyr1^{3+}$) and bis (trifluoromethanesulfonyl)imide ($TFSI^-$) and bis(fluorosulfonyl)imide ($FSI^-$) salts.

In one or more embodiments, the second inner layer includes one or more of an ionic liquid, plasticizer and oligomer.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

DESCRIPTION OF THE FIGURES

The invention is described with reference to the following figures, which are presented for the purpose of illustration only and are not intended to be limiting.

DETAILED DESCRIPTION

Some embodiments disclosed herein relate to batteries, in particular rechargeable (secondary) batteries with a lithium metal anode. The lithium metal anode may include a current collector and a multi-layer polymer coating disposed coated on the current collector. The multi-layer polymer coating may include two or more layers. A first outer layer may be in contact with the electrolyte. A second inner layer may be coated on the lithium metal layer. The first outer layer may form a polymer gel during use, e.g., formed in situ, e.g., formed when the electrolyte is added to the battery. The first outer layer may be a polymer gel (e.g., formed prior to use), e.g., a polymeric crosslinked gel. The second inner layer may provide mechanical strength and a physical barrier to the lithium metal layer. The second inner layer may include a single ion conductor. The multi-layer polymer coating may inhibit or reduce lithium dendrite growth, thereby improving the cycle life of the battery. Each of the layers of the multi-layer polymer coating may be coated on the current collector using various coating methods (e.g., dip coating). Each of the layers of the multi-layer polymer coating may conduct lithium ions.

Each of the layers of the multi-layer polymer coating may have a different composition. At least some of the layers of the multi-layer polymer coating may include the one or more components that are the same as the components in other layers. Some of the layers of the multi-layer polymer coating may be identical. Each of the layers of the multi-layer polymer coating may have the same or different thickness. Each of the layers of the multi-layer polymer coating may be non-porous.

The first outer layer may include a polymer (e.g., elastomeric polymer, hydrophobic polymer) and a liquid phase that swells the polymer to form a swollen polymer gel (e.g., formed in situ).

The first outer layer may include a crosslinked polymer gel. The polymer gel may be formed by mixing a polymer (e.g., PVDF) with a crosslinking monomer or macro-monomer (e.g., polyurethane monomer), electrolyte(s), and salt(s). The mixture can then be cured, e.g., by ultraviolet (UV) light or heat to form a crosslinked polymer gel. The second inner layer may include a crosslinked polymer gel.

The second inner layer or the first outer layer may be or include a single ion conductor (also referred to as a polyelectrolyte). In one or more embodiments, if the second inner layer is or includes a single ion conductor, the first outer layer is a swollen polymer gel or a crosslinked polymer gel. In one or more embodiments the polymer gel may swell by about 50-300% (e.g., about 50-100%, 75-125%, 100-125%, 100-150%, 125-175%, 150-200%, 175-225%, 200-250%, 225-275%, 250-300%). In one or more embodiments, the polymer gel may swell by about 100-1000%.

Various electrolytes may be used, including, for example, EC, PC, DME, EMC, and others, as well as combinations thereof. In one or more embodiments, the liquid phase is or includes an electrolyte or a combination of electrolytes.

Figure 1:
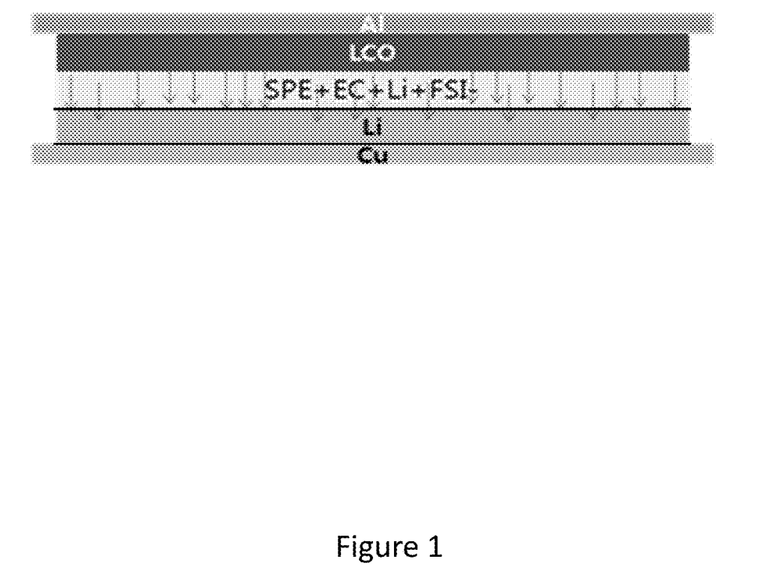
FIG. 1 is a schematic illustration of a conventional battery including a lithium metal.

In one or more embodiments, a multi-layer coating on Li metal anode is provided to prevent direct contact of lithium metal with volatile liquid electrolyte. Since Li metal is a highly reactive material, it reacts easily with all types of liquid electrolytes. The interaction of a lithium metal anode with an electrolyte in a conventional cell is well known and is shown schematically in FIG. 1. FIG. 1 depicts a lithium metal anode on a current collector, e.g., a copper foil. FIG. 1 also shows a cathode, such as lithium cobalt oxide, on an aluminum current collector, that is conventionally used in lithium ion batteries. The cell further includes an electrolyte that is in direct contact with the lithium anode metal. An exemplary electrolyte includes a solid polymer electrolyte (SPE), a liquid electrolyte solvent such as ethylene carbonate (EC) and a lithium salt, such as Lithium bis(fluorosulfonyl)imide (LiFSI). The arrows indicate the direction of lithium ion transport from the electrolyte into the metal anode. Dendrite growth is possible on this unconstrained lithium surface.

In one or more embodiments, to prevent direct contact of a liquid electrolyte with a Li metal anode, a multi-layer polymer coating is provided. In one or more embodiments, the multi-layer polymer coating acts as a protective layer or a buffer layer between the Li metal anode and the electrolyte. In one or more embodiments, coating a polymer layer on the lithium protects or delays diffusion of liquid electrolyte(s) through the polymer layer and to the lithium metal layer. In one or more embodiments, the coated polymer layer demonstrates high mechanical strength (e.g., between about 1 to about 10 mega pascals) and electrochemical stability (e.g., between about −1V to about 5V).

Figure 2:
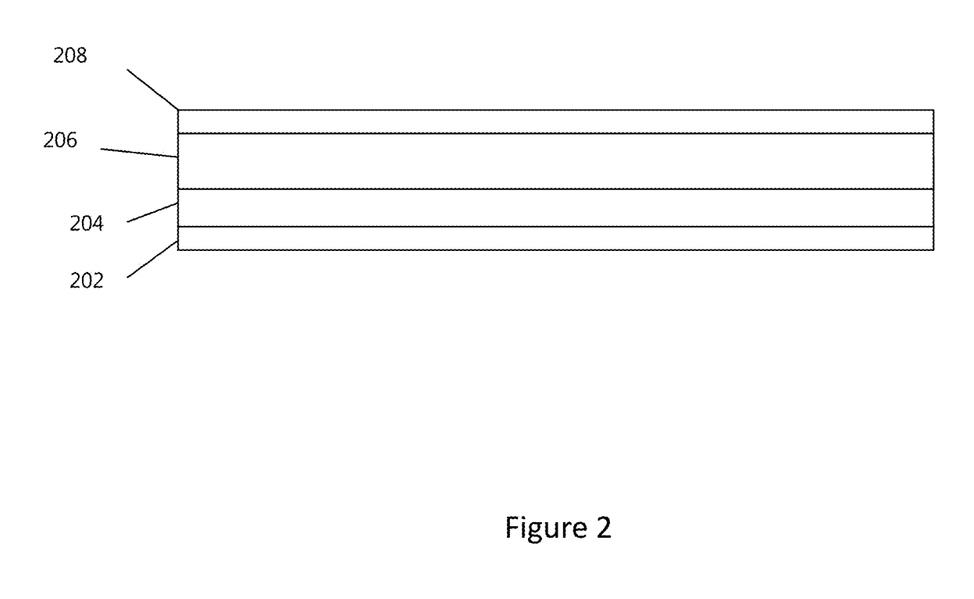
FIG. 2 is a schematic diagram of a lithium metal anode of a battery that includes a current collector, a Li metal layer, an inner barrier polymer layer, and an outer polymer layer, in accordance with some embodiments discussed herein.

FIG. 2 shows a schematic illustration of a lithium metal anode 200 that includes the multi-layer polymer coating according to one or more embodiments. The coating (layers 208 and 206) is applied to a lithium metal layer 204 disposed on a current collector 202. In one or more embodiments, the coating (e.g., layers 208 and 206) is applied by dip coating, spin coating, solvent casting, or other suitable methods. In one or more embodiments, the lithium metal layer 204 is applied to a bare current collector 202 at a thickness (e.g., about 20 microns, e.g., about 2 to about 50 microns) that supplies the necessary lithium content (energy capacity) for the cell. In one or more embodiments, a thin (e.g., about 2 to about 50 microns) lithium layer 204 can be applied, and the lithium layer 204 is formed during discharge. The multi-layer coating is disposed over the metal anode layer and includes a first outer layer 208 that is capable of absorbing liquid electrolyte, e.g., an aprotic solvent, to form a polymer gel, and a second inner layer 206 selected to provide a physical and chemical barrier to the electrolyte solvents. In one or more embodiments, the polymer in the first outer layer (208) is selected such that it can be solvated or swollen by an aprotic solvent and form a polymer gel. In one or more embodiments, the electrolyte can interact with and diffuse into the first outer layer 208, however, further progress towards the anode is slowed or inhibited by gel formation. Electrolyte access is further hindered by the mechanical barrier presented by the second inner layer 206. Both layers 208 and 206 are ionically conductive to lithium ions.

In one or more embodiments, the first outer layer 208 is selected to have a high ionic conductivity (e.g., in the range between about $1\times10^{-4}$ to about $3\times10^{-3}$ S/cm) with good mechanical properties, such that the first outer layer 208 resists swelling by electrolyte. In one or more embodiments, the second inner layer 206 is selected to have little to no reactivity with the Li metal, high mechanical properties, and good adhesion to Li metal. In one or more embodiments, both polymers are electrochemically stable in the range of about −1V-5V electrochemical voltage window.

In one or more embodiments, the multiple polymer layers are selected to synergistically provide protection of the lithium metal anode. It has been surprisingly discovered that two thin layers have a better insulation effect than one thick layer (e.g., of the same thickness as the two thin layers). While it has been determined that a two layer polymer coating structure has better protection than a single layer coating, additional embodiments that provide three, four or more layers are contemplated. In one or more embodiments, Li metal anode is coated with three polymer layers. In one or more embodiments, Li metal anode is coated with four polymer layers. In one or more embodiments, Li metal anode is coated with three or more polymer layers.

According to one or more embodiments, the multi-layer polymer coating includes a first outer layer (e.g., 208) positioned furthest from the lithium anode and adjacent to the electrolyte (it could be in direct contact with the second inner layer, or spaced apart from the second inner layer by one or more intervening layers). In certain embodiments, the thickness of the first layer (e.g., 208) is in the range of about 1-2 μm, e.g., about 1-1.25, 1.1-1.3, 1.25-1.4, 1-1.5, 1.25-1.5, 1.4-1.6, 1.5-1.75, 1.6-1.9, 1.5-2, 1.75-2 μm. The first outer layer (e.g., 208) is selected to provide a swellable coating that has a high ionic conductivity.

In one or more embodiments, the first outer layer includes a polymer that is swellable in aprotic organic solvents (e.g., tetrahydrofuran (THF), acetonitrile (ACN), etc., and any combination thereof) or ionic liquids (e.g., pyrolidinium salts, pyridinium salts, piperidine salts, etc., and any combination thereof).

The first outer layer (e.g., 208) may optionally include additional phases (e.g., blended phases), such as plasticizers (e.g., less than 10 weight % (based on total layer weight), e.g., 5-10 weight %) and ionic liquids (e.g., less than 10 weight %, e.g., 5-10 weight %), to increase ionic conductivity. In a cell, the first outer layer (e.g., 208) provides the first line of defense against the liquid electrolyte as it diffuses into the first outer layer of coated polymer. The ability of the polymer of the first outer layer (e.g., 208) to be solvated by the electrolyte slows its progress through the thickness of the first outer layer (e.g., 208). In addition, the presence of additional liquid phases, such as ionic liquids and plasticizers, serves to further slow the passage of the electrolyte. Since liquid phases are already present in the layer, e.g., the ionic liquid(s) or oligomer(s), the electrolyte can only diffuse in through the solid area of the polymer because there is no void volume for the electrolyte to occupy. In one or more embodiments, the first outer layer (e.g., 208) has an ionic conductivity in the range of between about $1\times10^{-4}$ S/cm to about $1\times10^{-2}$ S/cm. In one or more embodiments, the first outer layer (e.g., 208) has an ionic conductivity of greater than about $1\times10^{-3}$ S/cm. In one or more embodiments, the first outer layer has an ionic conductivity of greater than about $1\times10^{-4}$ S/cm.

According to one or more embodiments, the multi-layer polymer coating includes a second inner layer (e.g., 206 in FIG. 2) positioned closest to the lithium anode (it could be in direct contact with the lithium anode, or spaced apart from the anode by one or more intervening layers (not shown)). The second inner layer (e.g., 206) is selected to provide mechanical strength and electrochemical stability to the electrolyte. The second inner layer (e.g., 206) also provides another layer (e.g., polymer layer; e.g., elastomeric polymer layer) on top of lithium metal to prevent electrolyte from coming into contact with the anode. In one or more embodiments, the second inner layer (e.g., 206) includes a polymer that has a low solubility to the electrolyte solvents (e.g., the electrolyte solvents cannot dissolve the polymer). In addition, the high mechanical strength of the second inner layer discourages dendrite formation.

The second inner layer (e.g., 206) may optionally include additives, such as lithium salts (LiFSI, LiTFSI, etc. in an amount less than 10 weight %, e.g., 5-10 weight %), ionic liquids and/or plasticizers; however, the specific addition and its amount is selected to maintain the desired mechanical strength and physical barrier to electrolyte. In one or more embodiments, the additives are blended with the rest of the second inner layer components. In one or more embodiments, the second inner layer is a low swelling polymer, such as a polystyrene-fluorinated polymer co-polymer. In certain embodiments, the thickness of the second inner layer (e.g., 206) is in the range of about 0.2 to about 2 μm, e.g., about 0.2-0.5, 0.25-0.6, 0.4-0.75, 0.5-1, 0.6-0.9, 0.75-1, 0.8-1.2, 1-1.5, 1-1.25, 1.1-1.4, 1.25-1.5, 1.4-1.8, 1.6-1.9, 1.75-2 μm.

In one or more embodiments, the second inner layer is also ionically conductive, however, it is not required to have as great an ionic conductivity as the first outer layer, and can have an ionic conductivity in the range of between about $1\times10^{-4}$ S/cm to about $1\times10^{-3}$ S/cm. In one or more embodiments, the second inner layer has an ionic conductivity of greater than about $1\times10^{-3}$ S/cm. In one or more embodiments, the ionic conductivity of the first outer layer is higher than the ionic conductivity of the second inner layer (e.g., 10% higher, 20% higher, 30% higher, 40% higher).

In one or more embodiments the first outer layer (e.g., 208) can have the same thickness or substantially the same thickness as the second inner layer (e.g., 206). In one or more embodiments the first outer layer (e.g., 208) has a thickness larger than the thickness of the second inner layer (e.g., 206). In one or more embodiments the first outer layer (e.g., 208) has a thickness that is smaller than the thickness of the second inner layer (e.g., 206).

In one or more embodiments, similar materials can be used for both the first outer layer and the second inner layer. In one or more embodiments, the particular composition of each layer is selected to provide a first outer layer of a high swelling polymer containing a liquid phase, and a second inner layer of a low-swelling polymer having mechanical strength and serving as a physical barrier (to the electrolyte reaching the anode). Multi-layer coatings according to one or more embodiments demonstrate superior lithium insulation from electrolytes such as ethylene carbonate (EC), diethyl carbonate (DEC), dimethyl carbonate (DMC), propylene carbonate (PC), dimethoxyethane (DME), etc., and any combination thereof.

Exemplary polymers for use in the multi-layer coatings (e.g., in the first outer layer, the second inner layer, or both) described herein include groups or blocks of fluoropolymers, polyacrylonitriles, polyether ketone, polysulfones or polystyrenes, and any combination thereof. Other suitable polymers and combinations thereof are contemplated and may be used with the embodiments disclosed herein. The polymer groups or blocks can be, for example, homopolymers, block polymers, or combinations of miscible polymer groups. In one or more embodiments, the multi-layer coating can include polymer blends. In one or more embodiments, there are no limitations on the possible combinations of suitable polymers.

In one or more embodiments, a particularly suitable candidate polymer for use in the multi-layer coatings (e.g., in the first outer layer, the second inner layer, or both) includes fluorinated polymers. Fluorinated polymers are known as having high strength physical properties as well as electrochemical stability over a range of conditions. Further, fluorinated polymers are not dissolved by the aprotic liquid electrolyte systems typically used for lithium ion batteries. Exemplary fluorinated polymers include homopolymers such as polyvinylidene difluoride (PVDF), polyvinyl fluoride (PVF), poly(tetrafluoroethylene) (PTFE), polychlorotrifluoroethylene (PCTFE), perfluoroalkoxy polymers, fluorinated ethylene-propylene (FEP), polyethylenechloridetetrafluoroethylene (PECTFE), and the like. PVDF for example is a preferred high strength polymer that is resistant to solvents, acids, and bases. In one or more embodiments, co-polymers of fluorinated polymers, such as PVDF-HFP (polyvinylidene difluoride-hexafluoropropylene) co-polymer and PVDF-PS co-polymer, may also be used. In one or more embodiments, poly(ether ether sulfone) (PEES) can also be used, for example, as a copolymer or blend with fluorinated polymers. In one or more embodiments, other copolymers that may be used in the multi-layer coating include polyethylene oxide (PEO), polyacrylonitrile (PAN), polyether ketone, poly(methyl methacrylate) (PMMA) and polystyrene (PS).

In one or more embodiments, the polymer layer (e.g., of any layer of the multi-layer coating, e.g., of the first outer layer, the second inner layer, or both) can be a polymer-only layer (e.g., in one or more embodiments, at least one of the layers of the multi-layer coating is not a gel). In one or more embodiments, the polymer layer (e.g., of any layer of the multi-layer coating) is a composite material including a polymer with other inorganic or liquid oligomers. For example, fluorinated polymers such as PVDF homo polymer or PVDF-HFP co-polymer have low ionic conductivity, and suitable additives may be added to increase the ionic conductivity. In one or more embodiments, the multi-layer coating (e.g., the first outer layer (e.g., 208), the second inner layer (e.g., 206), or both) includes an ionic liquid, plasticizers or a lithium salt to increase the ionic conductivity of the first outer layer (e.g., 208), the second inner layer (e.g., 206), or both.

In one or more embodiments, the first outer layer and/or the second inner layer can include one or more of ionic liquids, lithium salts and plasticizers. In one or more embodiments, the ionic liquids can act as a plasticizer. In one or more embodiments, the ionic liquids can act as a plasticizer and can include, for example, tertiary and quaternary ammonium salts or pyridinium salts of lithium ion. In one or more embodiments, exemplary ionic liquids include ionic liquids such as, for example, N-butyl-N-methyl pyrrolidinium (Pyrl$^{4+}$) and N-methyl-N-propyl pyrrolidinium cations (Pyrl$^{3+}$) and bis(trifluoromethanesulfonyl)imide (TFSI$^-$) and bis(fluorosulfonyl)imide (FSI$^-$) anions. In one or more embodiments, exemplary load level of ionic liquids can be selected to provide ionic conductivities in the range of about $1\times10^{-4}$ S/cm to about $1\times10^{-2}$ S/cm.

In one or more embodiments, the first outer layer includes ionic liquids. In one or more embodiments, the second inner layer includes ionic liquids. In one or more embodiments, both the first outer layer and the second inner layer include ionic liquids. The ionic liquid imparts ionic conductivity to the layer in which it is present and also creates a liquid phase that occupies and fills the interstitial spaces of the polymer layer.

In one or more embodiments, the first outer layer and/or the second inner layer includes about 10-50 weight % (e.g., about 10-15, 12.5-20, 15-25, 20-30, 25-50, 25-35, 30-45, 35-45, 40-45, 40-50 weight %) ionic liquid(s). In one or more embodiments, the first outer layer includes an ionic liquid, and the second inner layer does not include an ionic liquid. In one or more embodiments, both the first outer layer and the second inner layer include an ionic liquid. In one or more embodiments, the ionic liquid included in the first outer layer is different from the ionic liquid included in the second inner layer. In one or more embodiments, the first outer layer and the second inner layer include the same ionic liquid. In one or more embodiments, the weight % of ionic liquid is higher in the first outer layer than in the second inner layer (e.g., 1-10, 5-15, 10-25, 20-30, 25-40, 35-50% higher).

In one or more embodiments, plasticizer(s) or oligomer(s) can be blended with the polymer (e.g., of the first outer layer, the second inner layer, or both) to increase the ionic mobility of the polymer. In one or more embodiments, the plasticizer can be a compound having an ether group. In one or more embodiments, the plasticizer is a compound having an ether group that is a $C_4$ to $C_{30}$ alkylene glycol dialkyl ether or a $C_3$ to $C_4$ cyclic ether, or a combination thereof. Non-limiting examples of alkylene glycol ethers include dimethoxyethane (DME), bis(2-methoxyethylether) (DGM), triethylene glycol dimethylether (TriGM), tetraethylene glycol dimethylether (TetGM), polyethylene glycol dimethylether (PEGDME), propylene glycol dimethylether (PGDME), and any combination thereof. A non-limiting example of a cyclic ether is dioxolane. In one or more embodiments, suitable plasticizers can include diglyme, tetraglyme, etc., and other oligomers, and any combination thereof. In one or more embodiments, plasticizers can be present to increase ionic conductivity and provide a liquid phase that slows the rate of electrolyte passage through the layers. The plasticizer uses one or a mixture of the compounds discussed above.

The amount of the plasticizer (e.g., in the first outer layer, the second inner layer, or both) can be in the range of about 5 to about 70 weight % (e.g., about 5-10, 5-15, 10-15, 10-20, 15-30, 25-50, 40-60, 50-70 weight %), based on 100 weight % of the total composition. In one or more embodiments, the amount of the plasticizer is about 20 to about 50 weight % (e.g., about 20-30, 25-35, 30-40, 35-40, 35-45, 40-45, 40-50 weight %). In one or more embodiments, an amount of plasticizer that is smaller than 5 weight % can decrease the ability to dissociate lithium ions, leading to a reduction in ionic conductivity. In one or more embodiments, an amount of plasticizer that is larger than 70 weight % can deteriorate mechanical properties of the protective layer.

In one or more embodiments, additives such as ionic liquid(s) and other similar large molecules such as oligomers or plasticizers can increase the ionic conductivity of the layer to which they are added, as well as increase the safety of the battery (e.g., because ionic liquids are non-flammable). In one or more embodiments, the polymeric gel is formed when the polymer is solvated with electrolyte solvent, ionic liquid phase or oligomer. In one or more embodiments, the ionic liquid in the first outer polymer layer can help prevent the liquid electrolyte from diffusing into the second inner layer. Diffusion typically occurs through the voids or pores of the solid phase in the polymer, however, when the voids or pores are already filled with ionic liquid(s), then the diffusion may not take place. Instead, if the voids/pores are filled with ionic liquid(s), solvent exchange may take place, but solvent exchange is generally significantly slower than liquid diffusion. Therefore, the overall time required for the electrolyte to pass from the outer layer of the coated polymer to the surface of the Li metal anode is extended and the liquid electrolyte is absorbed by the coated polymer layer.

In one or more embodiments, the multi-layer coating (e.g., the first outer layer, the second inner layer, or both) can include lithium salts. In one or more embodiments, non-limiting examples of lithium salts include one or any mixture of $LiClO_4$, $LiBF_4$, $LiPF_6$, $LiAsF_6$, $LiAlCl_4$, $LiSbF_6$, LiSCN, $LiCF_3SO_3$, $LiN(CF_3SO_2)_2$, $LiN(C_2F_5SO_2)_2$, $LiC_4F_9SO_3$, $LiC_4F_3CO_2$, and $LiN(CF_3CO_2)_3$. In one or more embodiments, these lithium salts may be used in the polymeric crosslinking gel layer described herein. In one or more embodiments, these lithium salts may be used in any layer of the multi-layer coating described herein. In one or more embodiments, the amount of the lithium salt is between about 3 to about 20 weight %, based on 100 parts by weight of the total composition of the layer in which the lithium salt is present. In one or more embodiments, the amount of the lithium salt is between about 5 to about 20 weight % (e.g., about 5-7, 6-9, 5-10, 8-12, 10-15, 12-17, 10-20, 15-20 weight %). In one or more embodiments, an amount of lithium salt that is smaller than three parts by weight can cause a reduction in the number of ions and a decrease in ionic conductivity, while an amount larger than 20 parts by weight can lead to crystallization and decreased ionic conductivity. In one or more embodiments, a load level of lithium salts in the first outer layer and/or the second inner layer is in the range of about 10-20 weight % of solid content.

Figure 3:
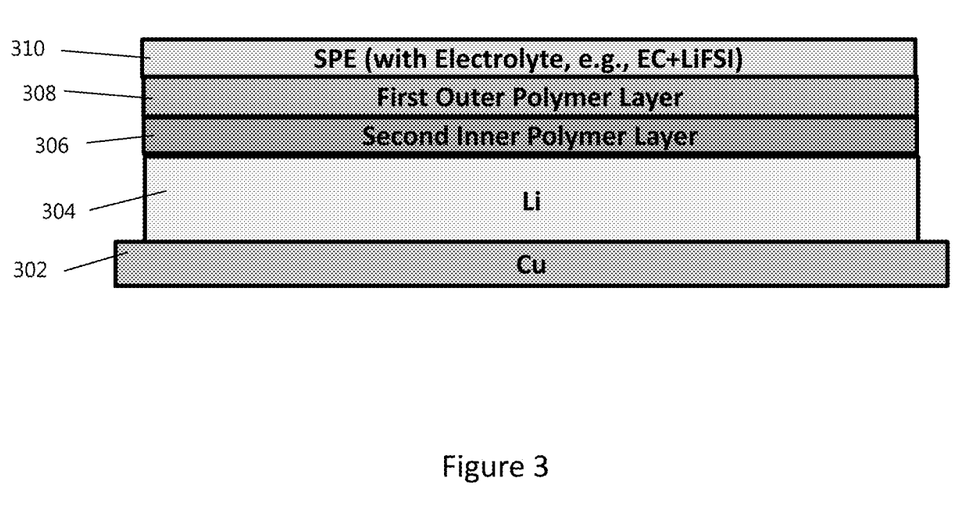
FIG. 3 is a schematic diagram of a lithium metal anode of a battery that includes a current collector, a Li metal layer, an inner barrier polymer layer, and an outer polymer layer, illustrating how the polymer layers prevent the diffusion of liquid electrolyte into the Li metal anode, in accordance with some embodiments discussed herein.

An exemplary two layer composition is shown in FIG. 3. The lithium metal anode 304 is disposed on a copper current collector 302. The lithium metal anode 304 can be applied to the current collector 302 at a thickness that supplies the necessary lithium content (energy capacity) for the cell, or a thin lithium layer can be applied and the full lithium layer can be formed during discharge. A coating is disposed over the metal anode layer (lithium metal anode 304) and includes a first outer layer 308 that is capable of absorbing liquid electrolyte 310, e.g., an aprotic solvent, to form a polymer gel and a second inner layer 306 selected to provide a physical and chemical barrier to the electrolyte solvents. The polymer suitable for the first (308) and second (306) layers can be independently selected. Any of the polymer materials described herein may be used for the layers 306 and 308. By way of example, in one or more embodiments, PS-Li (sulfonated polystyrene Li salt) can be used in the first layer 308, and PSAN (poly(styrene-co-acrylonitrile) can be used in the second inner layer 306. In another example, PS-Li can be used in the first layer 308 and PVDF can be in second inner layer 306. Also, in one or more embodiments, PSAN can be used in the first layer 308 and PS-Li can be used in the second inner layer 306. In one or more embodiments, many other combinations of materials are possible for the first polymer layer 308 and the second polymer layer 306. In one or more embodiments, the first layer 308 is a polymer gel layer that is infused with an ionic liquid, aprotic solvent or liquid plasticizer (or any combination thereof). In one or more embodiments, the first layer 308 includes between about 20-60 weight % (e.g., about 20-30, 25-35, 30-40, 35-45, 25-50, 40-50, 45-60, 50-60 weight %) aprotic solvent (which may be identical or may not be identical to at least one of the electrolyte solvents used in the battery). In one or more embodiments, the first polymer layer 308 is in contact with an electrolyte layer, shown here as a solid polymer electrolyte (SPE) (310) with a lithium salt containing liquid electrolyte, but, in one or more embodiments, the layer 310 can be a liquid electrolyte or a multi-layer combination of an SPE and a liquid electrolyte.

In one or more embodiments, the polymer in the first layer can experience about 50-300% swelling by weight. In one or more embodiments, the polymer in the first layer can experience about 100-1000% swelling by weight.

In one or more embodiments, the solid electrolyte is a solid graft copolymer electrolyte having at least two low glass transition temperature (Tg) polymer blocks. In one or more embodiments, the at least two low glass transition temperature (Tg) polymer blocks can include a hydrophobic block and a hydrophilic block. In one or more embodiments, a hydrophobic block can be or include a material such as polydimethylsiloxane (PDMS) and a hydrophilic block can be or include a material such as polyoxyethylene methacrylate (POEM) or polyoxyethylene acrylate (POEA). In one or more embodiments, the electrolyte includes Li salts.

In another aspect of the invention, a lithium metal battery includes a negative electrode (anode) coated with a multi-layer polymer coating as described herein, and a positive electrode. In one or more embodiments, the anode has lithium foil thickness ranging from about 0.1 to about 100 microns (e.g., about 0.1-0.5, 0.1-1, 0.5-3, 1-5, 3-10, 5-15, 10-20, 15-25, 20-30. 35-50, 40-60, 50-70, 60-80, 70-85, 80-90, 75-100 microns). In one or more embodiments, the anode has lithium foil thickness ranging between about 5 to about 50 microns (e.g., about 5-10, 7-15, 10-15, 12-20, 15-20, 5-25, 18-30, 20-25, 25-30, 27-35, 30-35, 32-45, 35-40, 40-45, 42-50, 25-50, 45-50 microns). In one or more embodiments, the positive electrode includes a positive electroactive material such as a metal oxide material that reversibly intercalates lithium at high electrochemical potentials, for example, at potentials above about 2V vs. lithium metal anode.

In one or more embodiments, the cathode material has a general formula of $Li_xM_yO_z$, where M is a transition metal such as Co, Mn, Ni, V, Fe, or Cr, or is a layered or spinel oxide material selected from the group comprising of $LiCoO_2$, $Li(Ni_{1/3}Mn_{1/3}C_{1/3})O_2$, $Li(Ni_{0.8}Co_{0.15}Al_{0.05})O_2$, $LiMn_2O_4$, $Li(Mn_{1.5}Ni_{0.5})_2O_4$, $VO_x$, or their combinations, or their lithium rich versions. In one or more embodiments, the cathode material has a general formula of $Li_xM_yPO_z$, where M is a transition metal such as Co, Mn, Ni, V, Fe, or Cr, such as $LiFePO_4$, $LiNiPO_4$, $LiCoPO_4$, or $LiMnPO_4$. In one or more embodiments, the cathode can be a porous coating comprising the active material powder (e.g., Lithium Cobalt Oxide; Lithium Nickel Oxide, etc.), a polymeric binder such as, for example, PVDF, and a conductive diluent, such as, for example, carbon black.

In one or more embodiments, the cathode and anode are held apart by a porous separator soaked with liquid electrolyte that prevents electrical contact while allowing ion conduction. In one or more embodiments, the electrolyte includes a lithium salt and an organic solvent. In one or more embodiments, the salt may be a conventional lithium ion salt and can be, by way of example, one or a mixture of $LiClO_4$, $LiBF_4$, $LiPF_6$, $LiAsF_6$, $LiAlCl_4$, $LiSbF_6$, LiSCN, $LiCF_3SO_3$, $LiN(CF_3SO_2)_2$, $LiN(C_2F_5SO_2)_2$, $LiC_4F_9SO_3$, $LiC_4F_3CO_2$, $LiN(CF_3CO_2)_3$.

In one or more embodiments, a lithium metal battery includes a positive electrode and a negative electrode with a multi-layer polymer coating deposited thereon, a separator interposed between the negative and positive electrodes, and an electrolyte. In one or more embodiments, the separator may be, for example, a polypropylene (PP), polyethylene (PE), or a tri-layer PP/PE/PP electrolytic separator membrane. In one or more embodiments, the liquid electrolyte can be, for example, about 2 to about 7M EC and/or about 2 to about 7M DME. In one or more embodiments, the battery can be housed in a cylindrical case or prismatic pouch.

In one or more embodiments, a first outer layer positioned for contact with an electrolyte is a crosslinked polymer gel. In one or more embodiments, the crosslinked polymeric gel has a chemically or physically crosslinked matrix in order to hold the solvated liquid electrolyte. In one or more embodiments, the crosslinked polymer gel layer protects the cell from dendrite growth of lithium metal and prevents volume expansion during cycling. In one or more embodiments, the polymer's elastomeric properties lead to longer cycle life and improved safety, as compared to non-coated bare lithium anode.

In one or more embodiments, the crosslinked polymer gel layer is formed by mixing a polymer (e.g., PVDF) with a monomer or macro-monomer (e.g., polyurethane (PU) monomer or macro-monomer), an electrolyte (which may or may not be the same as the battery electrolyte), a salt (e.g., any kind of salt that can be used in a lithium ion or a lithium polymer battery, including, e.g., LiFSI, Lithium bis(trifluoromethane)sulfonylimide (LiTFSI), Lithium hexafluorophosphate ($LiPF_6$), etc.). The mixture may then be cured by UV light or heat (or other suitable methods). In one or more embodiments, a monomer having a molecular weight in the range of about 1,000-10,000 (e.g., about 1,000-2,000; 1,500-3,000; 2,500-5,000; 3,500-6,000; 5,000-7,500; 6,000-8,500; 6,500-9,000; 7,500-10,000; 8,500-10,000) may be used. In one or more embodiments, a monomer having a molecular weight in the range of about 10,000-50,000 (e.g., about 10,000-12,500; 12,000-15,000; 12,500-17,500; 15,000-20,000; 17,500-22,500; 20,000-30,000; 25,000-35,000; 30,000-40,000; 35,000-45,000; 37,500-42,500; 40,000-50,000; 45,000-50,000) or higher may be used. In one or more embodiments, lower molecular weight monomers (e.g., lower molecular weight PU monomers) have higher crosslinking density than higher molecular weight monomers (e.g., higher molecular weight PU monomers) due to the fact that short chains have more ends with crosslinkable groups than longer chains. In one or more embodiments, higher crosslinking density may result in less swelling by the electrolyte. In one or more embodiments, polyurethane monomers may be used. In one or more embodiments, acrylate monomers may be used. In one or more embodiments, the crosslinking monomer may be di-functional, tri-functional, or may include multifunctional groups with double bonds for free radical polymerization.

In one or more embodiments, the crosslinked polymer gel layer is evenly applied (e.g., on the second inner polymer layer). In one or more embodiments, the crosslinked polymer gel layer may be evenly spread (e.g., on the second inner polymer layer) using a lamination process to uniformly apply the gel layer. In one or more embodiments, a laminator may be used to press and evenly distribute the crosslinked polymer gel layer. In one or more embodiments, the thickness of the crosslinked polymer gel layer is about 1 micron. In one or more embodiments, the thickness of the crosslinked polymer gel layer is no greater than about 2 microns. In one or more embodiments, the thickness of the crosslinked polymer gel layer is about 0.5 to about 2 microns (e.g., 0.5-0.75, 0.5-1, 0.75-1, 0.6-1, 0.8-1.25, 1-1.25, 1.1-1.5, 1.25-1.5, 1.15-1.75, 1.25-1.75, 1.5-1.75, 1.6-1.8, 1.75-1.9, 1.75-2 microns).

In one or more embodiments, the first outer layer includes between about 10-30 weight % (e.g., about 10-15, 10-20, 15-20, 15-25, 20-25, 25-30 weight %) polymer. In one or more embodiments, the first outer layer includes between about 10-30 weight % (e.g., about 10-15, 10-20, 15-20, 15-25, 20-25, 25-30 weight %) salt. In one or more embodiments, the first outer layer includes about 20% or between about 10-30 weight % (e.g., about 10-15, 10-20, 15-20, 15-25, 20-25, 25-30 weight %) monomer or macro-monomer. In one or more embodiments, the first outer layer includes between about 10-70 weight % (e.g., about 10-15, 10-20, 15-20, 15-25, 20-25, 25-30, 25-35, 30-45, 35-50, 40-50, 45-60, 45-55, 45-65, 50-70 weight %) electrolyte.

In one or more embodiments, a variety of elastomeric polymers may be selected for use in the first outer layer and/or the second inner layer (or any other layers of the multi-layer polymer coating) depending on desired battery characteristics. In one or more embodiments, the elastomeric polymer can be selected from the group of polyurethane functional elastomers, styrene-butadiene block copolymers, fluorinated copolymers, silicone based polymers, and any combination thereof. In one or more embodiments, the elastomeric polymers may be blended with other crosslinkable monomers to form a polymeric matrix. In one or more embodiments, the elastomeric polymer prevents lithium dendrites from penetrating the polymer layer.

In one or more embodiments, the crosslinked polymer gel layer is composed with elastomeric polymer as a back bone of the matrix, with soft segment polymer, liquid electrolyte, and Li salts. The liquid electrolyte may be or include EC, PC, DME, DMC, ethyl methyl carbonate (EMC), and any combination thereof. In one or more embodiments, the particular liquid electrolyte or combination of liquid electrolytes may be chosen depending upon the cathode type, voltage, and other relevant factors. In one or more embodiments, PU can be used as the elastomeric polymer, and PVDF can be used as the soft segment polymer. In one or more embodiments, the soft segment polymer is selected from the group consisting of polyvinylidene difluoride (PVDF), polyvinyl fluoride (PVF), poly(tetrfluoroethylene) (PTFE), polychlorotrifluoroethylene (PCTFE), perfluoroalkoxy polymers, fluorinated ethylene-propylene (FEP), and polyethylenechloridetetrafluoroethylene (ECTFE). In one or more embodiments, a solvent can be selected from liquid electrolytes such as EC, DME and di-glyme as additives.

In one or more embodiments, the second inner polymer layer can be or include a single ion conductor or polyelectrolyte. In one or more embodiments, the second inner layer can be or include a polymer with anionic functional groups. In one or more embodiments, the second inner polymer layer can be or include a polymer with anionic functional groups such as sulfonic acid group, phosphonic acid group, carboxylic acid group, and other suitable functional groups, and combinations thereof. In one or more embodiments, the ionic polymer layer can function to lower bulk resistance of the cell and prevent Li+ depletion at the interface between the Lithium metal and the polymer. (Ionomer-Liquid Electrolyte Hybrid Ionic Conductor for High Cycling Stability of Lithium Metal Electrodes, *Scientific Reports* 5, 14458 (2005)), which is incorporated herein by reference in its entirety.

In one or more embodiments, the single ion conducting polymer(s) included in the second inner layer can be any polymer having a sulfonic acid group, a carboxylic acid group, a phosphonic acid group, or any polymer chain with an anionic group attached as a functional group, and any combination thereof. In one or more embodiments, the single ion conducting polymer is or includes polystyrene sulfonic acid, Nafion (sulfonated tetrafluoroethylene based fluoropolymer-copolymer), sulfonated poly(ether ether sulfone), sulfonated poly(ether ketone), and any combination thereof.

In one or more embodiments, the single ion conducting polymer discussed above may be included in the second inner layer, or in other layers of the multi-layer polymer coating. In one or more embodiments, the single ion conducting polymer is included in the layer (of the multi-layer polymer coating) that is in contact with the lithium anode.

Experimental Examples

In order to assess the ability of the multi-layer polymer coating to protect the anode from degradation, comparative lithium ion batteries containing (a) no polymer coating, (b) a single layer polymer coating made up of PVDF homopolymer with ionic liquid with LiFSI 10 weight % based on the weight of the layer PVDF and (c) a double layer polymer coating having a second inner layer with poly(styrene-acrylonitrile) with LiFSI and a first outer layer of PVDF with ionic liquid and LiFSI 10 weight % PVDF were prepared, and the cycling life of the cells was measured.

The cells were assembled using a double-sided cathode and two lithium metal coated copper anodes. The cathode can be prepared, for example, by mixing carbon powder with cathode active materials such as $Li_2S_n$, $LiMn_2O_4$, $LiCoO_2$, or $LiNiO_2$, etc. and binding polymer. For the experiments discussed herein, a $LiCoO_2$ cathode was used (but those of skill in the art would appreciate that other Lithium cathodes can be used as well). The polymer layers were coated by using dip coating technique, with thickness of less than 2 μm for each layer. A separator was placed between each anode and a cathode surface. Then an electrolyte was added. The electrolyte can vary depending on the battery systems, but for the experiments discussed herein, ethylene carbonate (EC) with 2M LiFSI salt was used. The assembly was placed in an aluminum pouch and was vacuum sealed to form a complete single unit cell.

Figure 4:
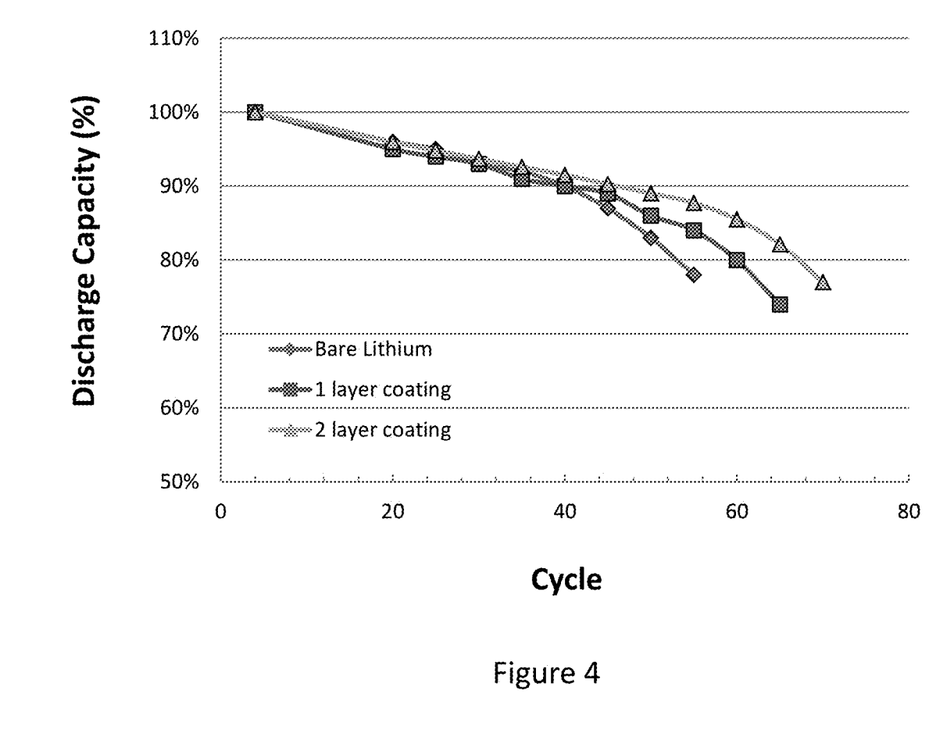
FIG. 4 shows a discharge capacity fading comparison between a non-coated bare lithium metal anode, a Li metal anode coated with a single layer, and Li metal anode coated with two polymer layers (e.g., as shown in FIGS. 3-4), in accordance with some embodiments discussed herein.

The change of discharge capacity (%) with cycle life is plotted in FIG. 4. FIG. 4 is a graph showing a comparison between the battery performance of a bare lithium metal (non-coated) anode, a single layer coated anode, and a double layer coated anode. As shown in FIG. 4, the double layer coated anode shows the longest cycle life and the non-coated anode shows the shortest cycle life. FIG. 4 illustrates that the double polymer layer coated anodes demonstrate superior performance as compared to the non-coated or singly coated anodes.

Figure 5:
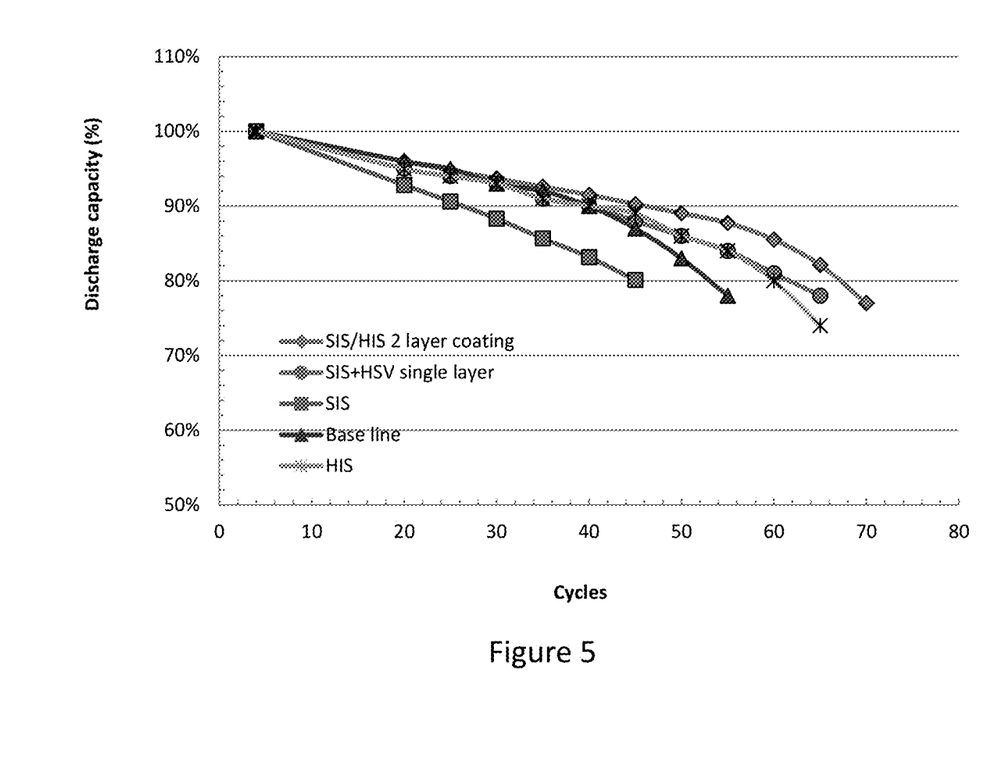
FIG. 5 shows a discharge capacity fading comparison between various polymer-coated lithium metal anodes, in accordance with some embodiments discussed herein.

The effect of different polymer systems on their ability to protect the anode was also evaluated. FIG. 5 shows the effect of different polymer systems on cycle life. The polymer coatings were made using a dip coating method. The composition of each coating layer was blended with the test polymer, lithium salt, and plasticizer. Coatings identified as HIS included PVDF homopolymer with ionic liquid as the plasticizer and LiFSI as the lithium salt. 4% PVDF solution in DMF (dimethylformide) was prepared and plasticizer with LiFSI was added to 10 weight %. The lithium metal anode was coated using a dip coating method. Coatings designated as SIS were prepared similarly to the HIS coatings and included poly(styrene acrylonitrile) copolymer with ionic liquid with LiFSI salt. Coatings designated as HSV were PVDF resin-based coatings commercially available from Arkema company (e.g., KYNAR® coatings). Comparative lithium ion batteries (base line) were prepared, and the cycling life of the cells were measured.

Depending on the polymer composition coated on each layer, the performance of the cell can be different. For example, as shown in FIG. 5, a single layer SIS (polystyrene-co-acrylonitrile with ionic liquid) shows a worse performance than base line non-coated anode, however, a multi-layer coating including a layer of SIS and a layer of HIS (PVDF homo-polymer with ionic liquid) shows the best performance. Further, as shown in FIG. 5, the double layer coated anode (SIS/HIS) shows a better cycle life than the single HIS layer coated anode and than the single SIS+HSV layer coated anode. Thus, FIG. 5 confirms that the double layer coating provides greater anode protection than a single layer.

Figure 6:
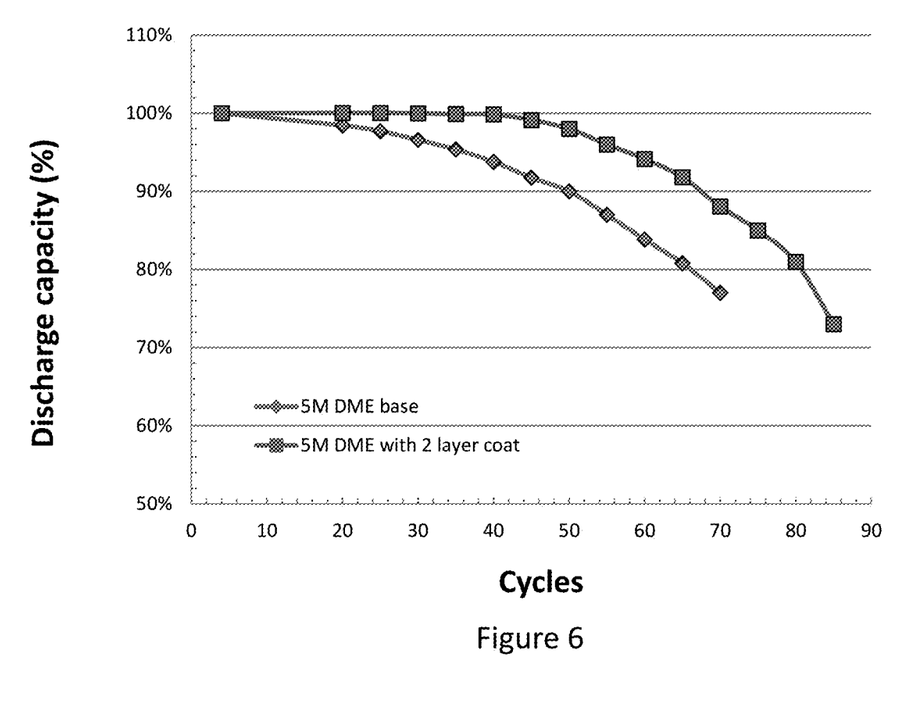
FIG. 6 shows a discharge capacity fading comparison between a non-coated bare lithium metal anode and a Li metal anode coated with two layers (e.g., as shown in FIGS. 3-4) with a high concentration of electrolyte, in accordance with some embodiments discussed herein.

The multi-layer polymer coatings can also be used in systems having a variety of different salts and electrolyte systems. FIG. 6 shows cycling performance of lithium ion batteries employing a high salt concentration (5M LiFSI) in a DME (dimethyl ether) electrolyte. As shown in FIG. 6, cells with and without coated anode were tested, and results similar to those shown in FIGS. 4 and 5 were observed in high salt concentration electrolyte systems. Namely, the anode coated with 2 polymer layers (SIS and HIS) demonstrated superior performance to the non-coated anode.

A higher numbers of coatings resulted in coatings with a greater total thickness. In one or more embodiments, if the coating layer is too thick, it can impede lithium ion transport. In one or more embodiments, a coating layer having a two layer coated anode can be used. In one or more embodiments, the thickness for the first outer layer is <about 1 μm and the thickness of the second inner layer is less than about 2 μm. As the thickness of each layer can reduce total energy volume density, in one or more embodiments, layers that are as thin as possible are used.

Figure 7:
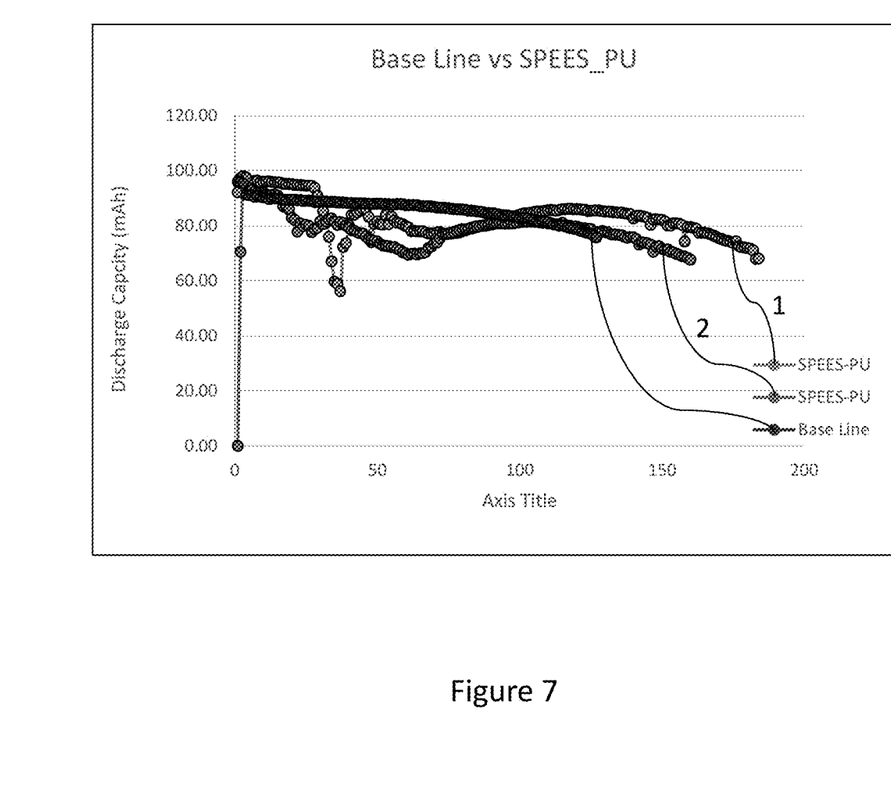
FIG. 7 shows a cell discharge capacity comparison between a non-coated bare lithium metal anode and a Li metal anode coated with two layers (a polymeric crosslinked gel first outer layer and a single ion conductor second inner layer), in accordance with some embodiments discussed herein.

Referring now to FIG. 7, cycling data for three different cells is shown: two cells with a first outer layer and a second inner layer, and a base line cell with a non-coated anode. The multi-layer cells shown in FIG. 7 included a polymeric crosslinked gel layer as the first outer layer (in contact with the electrolyte) and a single ion conductor layer as the second inner layer (in contact with the anode). The first outer layer and the second inner layer were each about 1 μm, and no more than 2 μm. The crosslinking precursor solution was prepared by mixing 60 weight % 5M LiFSI DME electrolyte, 15 weight % polyurethane macro-monomer, 15 weight % PVDF polymer, and 10 weight % LiFSI solvent. The graph labeled "2" is for a cell that included a high molecular weight polyurethane macro-monomer (molecular weight on the order of 30,000 or higher), and the graph labeled "1" is for a cell that included a lower molecular weight polyurethane macro-monomer (molecular weight on the order of 10,000). As seen in FIG. 7, the cells including the two layers demonstrated superior performance to the base line cell that included the non-coated anode. The cells using the lower molecular weight polyurethane exhibited slightly longer cycle life than the cells using the higher molecular weight polyurethane.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention. For example, while the invention is described with reference to lithium anodes, it is recognized that the protective coating could be used with any reactive metal anode. The ion salts would be adjusted to account for the different active ion.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A lithium metal anode comprising:
a lithium metal layer; and
a multi-layer polymer coating over the lithium metal layer, the multi-layer polymer coating comprising:
a first outer polymeric crosslinked gel layer positioned for contact with a battery electrolyte, the first outer polymeric crosslinked gel layer comprising a first polymer, a soft segment polymer, and an electrolyte within a crosslinked matrix; and
a second inner layer disposed between the lithium metal layer and the first outer polymeric crosslinked gel layer and in direct contact with the first outer polymeric crosslinked gel layer, the second inner layer comprising a second polymer providing mechanical strength and a physical barrier to the lithium metal layer.

2. The lithium anode of claim 1, wherein the soft segment polymer, the second polymer, or the soft segment polymer and the second polymer is one or more polymers selected from the group consisting of fluoropolymers, polyacrylonitriles, poly(ether ether sulfones) and polystyrenes, polyether ketone, and any combination thereof.

3. The lithium anode of claim 1, wherein the soft segment polymer, the second polymer, or the soft segment polymer and the second polymer comprises one or more fluoropolymers selected from the group consisting of homo polymers and copolymers of polyvinylidene difluoride (PVDF), polyvinyl fluoride (PVF), poly(tetrfluoroethylene) (PTFE), polychlorotrifluoroethylene (PCTFE), perfluoroalkoxy polymers, fluorinated ethylene-propylene (FEP), and polyethylenechloridetetrafluoroethylene (ECTFE).

4. The lithium anode of claim 1, wherein the first polymer, the second polymer, or the first polymer and the second polymer is an elastomeric polymer.

5. The lithium anode of claim 4, wherein the elastomeric polymer is selected from the group consisting of polyurethane functional elastomers, styrene-butadiene block copolymers, fluorinated copolymers, silicone based polymers, and any combination thereof.

6. The lithium anode of claim 1, wherein the second polymer is or comprises a single ion conductor.

7. The lithium anode of claim 6, wherein the second polymer comprises a functional group selected from the group consisting of a sulfonic acid group, a carboxylic acid group, and a phosphonic acid group.

8. The lithium anode of claim 6, wherein the second polymer comprises an anionic functional group.

9. The lithium metal anode of claim 1, wherein the first outer polymeric crosslinked gel layer is formed by mixing the soft segment polymer, a first polymer monomer, an electrolyte, and a salt, and curing the mixture.

10. The lithium metal anode of claim 9, wherein the salt comprises an ionic liquid comprising salts of lithium.

11. The lithium metal anode of claim 10, wherein the ionic liquid is selected from N-butyl-N-methyl pyrrolidinium ($Pyrl^{4+}$) and N-methyl-N-propyl pyrrolidinium cations ($Pyrl^{3+}$) and bis(trifluoromethanesulfonyl)imide ($TFSI^-$) and bis(fluorosulfonyl)imide ($FSI^-$) salts.

12. The lithium metal anode of claim 9, wherein the electrolyte comprises an electrolyte solvent and a lithium salt.

13. The lithium metal anode of claim 12, wherein the electrolyte solvent is selected from the group consisting of ethylene carbonate, diethyl carbonate, dimethyl carbonate, propylene carbonate, dimethoxyethane, and any combination thereof.

14. The lithium metal anode of claim 1, wherein the second inner layer comprises one or more of an ionic liquid, a plasticizer and an oligomer.

15. The lithium anode of claim 1, wherein the second inner layer has a toughness selected to reduce dendrite formation.

16. The lithium anode of claim 1, wherein the thickness of the second inner layer is in the range of 0.2-2 µm.

17. The lithium anode of claim 1, wherein the thickness of the first outer layer is in the range of 1-2 µm.

18. The lithium anode of claim 1, further comprising a current collector in electrical contact with the lithium metal layer.

19. A lithium battery comprising:
a positive electrode;
a lithium metal anode according to claim 1;
a separator disposed between the positive and negative electrodes; and
the battery electrolyte.

20. A lithium battery, comprising:
a cathode;
a lithium metal anode, according to claim 1; and
the battery electrolyte.

* * * * *